UNITED STATES PATENT OFFICE 2,289,761

DERIVATIVES OF P-AMINOBENZOL SULPHONIC ACID-ANILIDE AND PROCESS OF PREPARING THE SAME

Claus Diehl, Darmstadt, Germany, assignor to Merck & Co., Inc., Rahway, N. J., a corporation of New Jersey No Drawing. Application January 18, 1939, Serial No. 251,534. In Germany January 25, 1938

4 Claims. (Cl. 260—397.7)

This invention relates to derivatives of p-aminobenzenesulphonanilide, and to processes of preparing the same.

In recent years, p-aminobenzenesulphonamide ("Sulphanilamide") has been recognized as an effective agent in the combating of bacterial infections. Observations with regard to the practical application of this compound have frequently shown, however, that desirable large dosages of this remedy may cause symptoms of poisoning.

It has therefore been sought to obtain less poisonous derivatives of sulphanilamide. Among the large number of compounds which were prepared in the course of these investigations, there has been described p-aminobenzenesulphonanilide (see Buttle, Gray and Stephenson, The Lancet, 230, 1286 (1936); also, Trefouel, Nitti and Bovet, Ann. Inst. Past., 58, 30 (1937). The activity of this compound was verified in animal tests.

In comparison to sulphanilamide, the anilide, in animal tests, at first shows better tolerance in large single doses. It was found, for example, in a comparative test that mice which were given perorally 75 mg. of sulphanilamide, per 20 g. mouse, in a gum arabic solution as a single dose, died on the second or third day. According to the same testing method, 200 mg. of sulphanilanilide per 20 g. mouse was tolerated without reaction. In a thorough investigation of p-aminobenzenesulphonanilide it was found, however, that the repeated administration, over a prolonged period, of large doses of the compound, necessary to combat streptococci infections, led to serious damage of the organism, which was most conspicuous in the blood picture. The final result is a general decomposition of the blood corpuscles.

After comprehensive experiments, undertaken to improve, by modification of the molecule, the pharmacological properties of p-aminobenzenesulphonanilide, I have discovered that the introduction of acyl groups in the 4-position of the anilido group causes an unforeseen, considerable lessening of the injurious effects without impairing the activity to any degree.

In particular was it surprising to find in these experiments that p-aminobenzenesulphonanilide, substituted by an acyl group in the 3-position of the anilido rest, was considerably less active and with continued administration was even more injurious than the unsubstituted anilide, so that the introduction of the acyl group in the p-position to the amino group constitutes a decided improvement of the pharmacological properties.

Comprehensive animal tests made with the new p-aminobenzenesulphon-(4-acylanilides) have shown that these compounds, while possessing about equal action, are considerably less toxic than the basic compound of the series, sulphanilamide. Whereas, as mentioned above, mice having been given one administration of 75 mg. of sulphfanilamide per 20 g. mouse. died after a few days, the 4-acetylanilide is tolerated without any reaction in doses, for example of 200 mg. per 20 g. mouse.

The object of the present discovery is therefore the preparation of p-aminobenzenesulphon-(4-acylanilides) with the following formula:

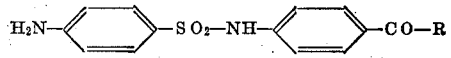

wherein R is a hydrocarbon group, according to various methods. For example, a benzenesulphonhalide, having in p-position a group which is easily convertible into the amino group (for example, a p-acylaminobenzenesulphonic acid chloride) is reacted with an aniline derivative having in the p-position the group R—CO—, and finally changing the group convertible into NH₂, into this radical. The reaction equation for this process is as follows:

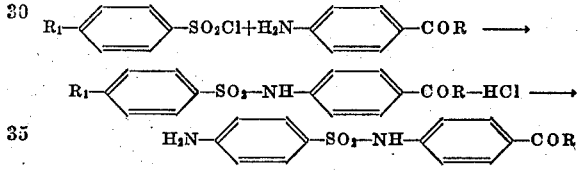

wherein R₁ is a group convertible into the NH₂ group, and R is a hydrocarbon group.

The conversion of the group R₁ into the amino group can take place, for example, by saponification (of an acyl amino group), by reduction (for example, of a nitro group), etc.

Examples

I. 13 parts of 4-amino-acetophenone, 25 parts of dry acetylsulphanylchloride and 30 parts of potassium acetate are fused for one hour on the steam bath. After cooling, the pasty mass is taken up in water and acidified slightly with dilute hydrochloric acid to congo red. The precipitate is filtered off by suction, washed thoroughly with water and methanol, and dried.

The p-acetylaminobenzenesulphon-(4-acetoanilide) obtained forms a slightly yellowish sandy powder. It melts at 240–241° C.

Upon boiling under reflux with 10-12 parts by weight of approximately 16% hydrochloric acid, there is obtained after 30-45 minutes a clear solution which immediately solidifies into a thick crystalline mass. The product that separates out after cooling, is treated with a slight excess of dilute sodium hydroxide solution, filtered off again, well washed with water, and recrystallized from methanol with the use of animal charcoal. There is obtained the p-aminobenzenesulphon-(4-acetoanilide) in a better than 90% yield as slightly yellowish crystals, which are difficultly soluble in most of the organic solvents (with the exception of hot methanol) and in water. The melting point of the compound is 208° C.

II. In a similar manner, 4-propionyl-aniline prepared according to Kunckell (Berichte der Deutschen Chemischen Gesellschaft, 33, 2642), when treated with p-acetyl-aminobenzenesulphochloride, gives p-acetyl-aminobenzenesulphon-(4-propionylanilide), which on saponification with 16% hydrochloric acid yields p-aminobenzenesulphon-(4 - propionylanilide) melting at 203° C. On recrystallization from methanol, coarse, slightly brownish laminae are obtained.

III. 22 g. (1 mol) of p-nitrobenzenesulphonyl chloride prepared according to Bell (Journal of the Chemical Society, London 1928, Trans., 2776), dissolved in 30 cc. of acetone, is added to a mixture consisting of 27 g. (2 mols) of 4-aminoacetophenone and 30 cc. of acetone and heated for a short time to the boiling point. On cooling, crystallization takes place. Upon the addition of water, the p-nitrobenzenesulphon-(4-acetoanilide) is separated completely and is obtained in almost theoretical yield by filtering and by washing with methanol and ether. When recrystallized once from hot methanol with the use of animal charcoal, the product is pure. It has a slightly yellowish color and melts at 192-194° C. The reduction of the nitro to the amino group is done according to one of the usual processes, for example, catalytically in a methanol solution at 55-60° C. with palladium charcoal. Working up gave the same product as described in Example I, with a melting point of 208° C.

IV. A solution of p-acetylaminobenzenesulphochloride (1 mol) in methanol is treated with a methanol solution of p-aminobenzophenone (1 mol) and pyridine (1 mol), and there takes place, with brisk generation of heat, a conversion into p-acetylaminobenzenesulphon-(4-benzoylanilide) which, on addition of water, separates out as an oil. On stirring with ether, it is changed into the crystalline form. Its melting point lies between 216-218° C.

The saponification is carried out with 16% hydrochloric acid and with the addition of some methanol, whereupon the cleavage product separates out on cooling as an oil which, when treated with soda, crystallizes rapidly. On recrystallization from methanol, the p-aminobenzenesulphon-(4-benzoylanilide) is obtained as beautiful needles melting at 182-183° C. In contrast to the product described in Example I, the compound dissolves readily even in cold acetone, in ethyl acetate, and somewhat more difficultly in alcohol and in chloroform.

I claim:
1. p-acetylaminobenzenesulphon -(4 -acetoanilide).
2. p-aminobenzenesulphon-(4-acetoanilide).
3. p-nitrobenzenesulphon-(4-acetoanilide).
4. Compounds of the general formula

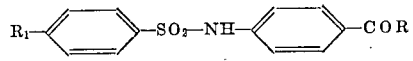

wherein R is selected from the group consisting of lower alkyl and phenyl radicals, and R₁ is selected from the group consisting of acetylamino, amino, and nitro radicals.

CLAUS DIEHL.